Patented May 1, 1934

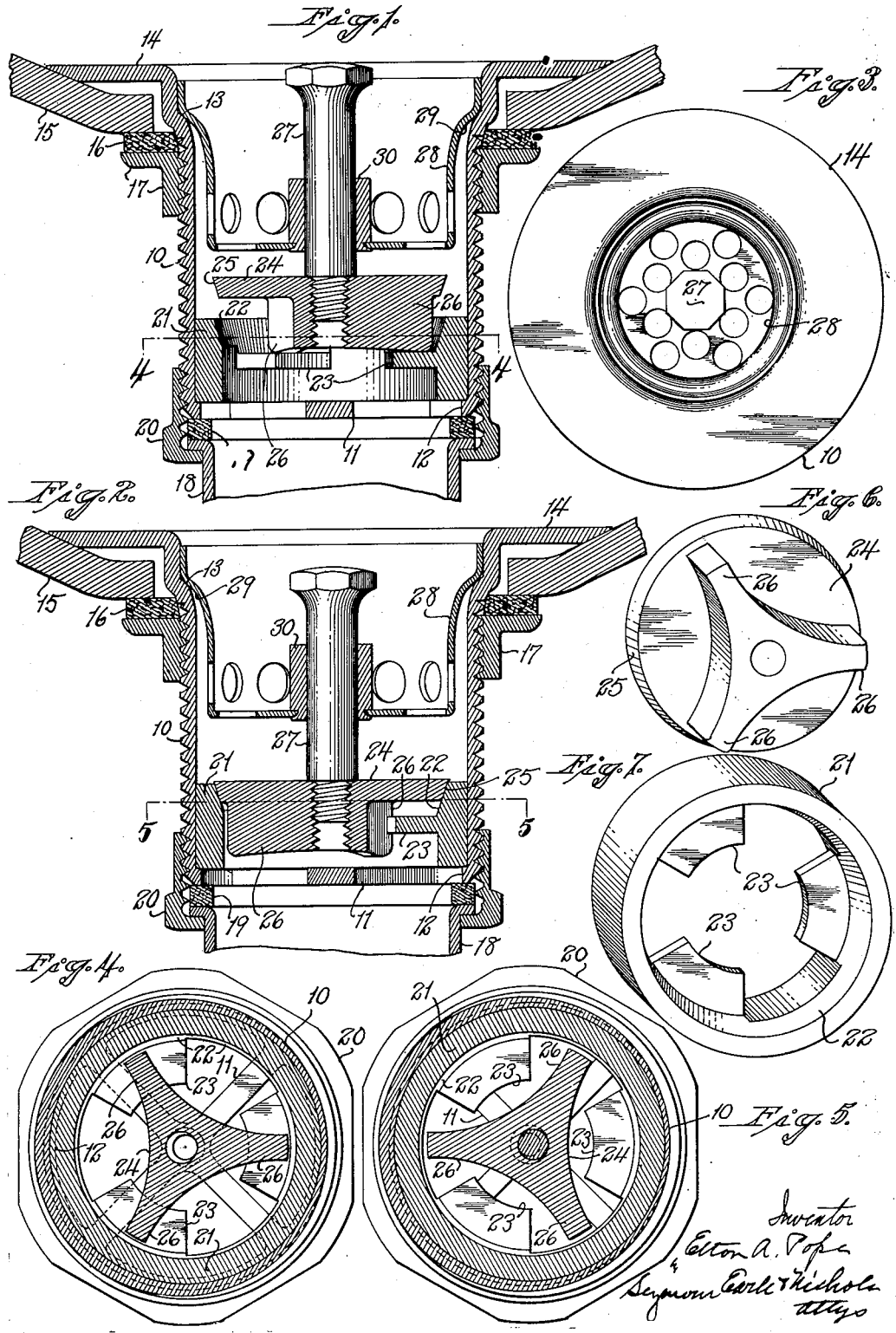

1,956,654

UNITED STATES PATENT OFFICE 1,956,654

WASTE PIPE FITTING

Elton A. Pope, Waterbury, Conn., assignor to The Chase Companies, Incorporated, Waterbury, Conn., a corporation Application January 9, 1933, Serial No. 650,829

3 Claims. (Cl. 4—287)

This invention relates to a waste-pipe fitting and more particularly to such a fitting especially adapted for use in connection with sinks, dishwasher tanks, and the like.

An object of the invention is to provide a new and useful fitting combined with a strainer and a plug, and of improved simplicity and durability of construction and cleanliness and reliability of operation.

To this end the invention, in one embodiment thereof, contemplates a substantially-cylindrical drawn shell-body having a plug-seat supported therein and containing a multi-perforate strainer-basket and a centrally-stemmed plug-member. The plug-member is removable with the basket from the body, but unlike most similar devices the plug is supported by the plug-seat of the body in both its drain-closing and drain-opening positions, not by the basket in the open position, the basket and plug being operative independently of each other. Since the basket thus coacts only with the body, and the plug also only with the body, the necessity for nice fitting of the parts is greatly reduced and it is practicable to make the parts either of drawn shells or of die-castings with a minimum of machining operations.

Other objects and characterizing features of the invention will appear from the following detailed description of one embodiment thereof, taken in connection with the accompanying drawing, in which:

Fig. 1 is a broken view in vertical longitudinal section of a waste-pipe fitting embodying the invention and showing the plug in its raised open-drain position;

Fig. 2 is a similar view with the plug in its lowered drain-closing position;

Fig. 3 is a detached plan view of the complete fitting;

Fig. 4 is a plan view in horizontal section on the line 4—4 of Fig. 1;

Fig. 5 is a similar view on the line 5—5 of Fig. 2;

Fig. 6 is a detached reverse plan view in perspective of the plug; and

Fig. 7 is a detached direct plan view of the plug-seat.

In the embodiment of the invention herein disclosed, there is provided a body 10 of substantially-cylindrical form, having an integral flat bottom, widely perforated to leave only the centrally-united, diametral cross-strips 11 and between them the narrow inturned rim 12. Near its upper end the body is slightly expanded to form an internal shoulder 13. The top of the body is formed with an outwardly-extending, beveled clamping-flange 14.

As herein shown, the body is supported on the flange 14 in a centrally-perforated, dished depression in the bottom 15 of a sink or tank. The outer surface of the body is threaded and the body is locked and sealed in place in the sink bottom by a washer 16 and nut 17.

The bottom end of the body is connected and sealed to a drain pipe 18 in well-known fashion by an interposed washer 19 and a nut or union 20.

A plug-seat 21 in the form of a short hollow cylinder fits down snugly into the interior of the body 10 and rests on the rim 12 and cross-strips 11 to which it may be additionally soldered or sweated to insure a water-tight joint between the plug-seat and the body. The interior bore of the plug-seat is expanded to form a conically-tapering seating-surface 22. Just below this seating-surface, the plug-seat is formed with three horizontal, inwardly-extending and inwardly-tapered supporting-lugs 23 whose inner extremities are curved on a circle concentric with the body and plug-seat.

A disk-shaped plug 24, whose circumference is beveled or chamfered as at 25 to fit the seating-surface 22, serves to close the drainage passage as in Fig. 2, or to open the same as in Fig. 1. On the under surface of the plug 24 are three integral vertically, radially-disposed supports 26, which in the position shown in Fig. 2, lie between the lugs 23.

A stem or handle 27 is centrally vertically attached to the plug 24 by which the plug may be manipulated. When the plug is raised into the position shown in Fig. 1, it may be rotated to bring the supports 26 over the lugs 23 and thus hold the plug up.

A generally-cylindrical, flat-bottomed, multi-perforate strainer-basket 28 is located within the upper part of the body 10 and is formed near its top with an expanded circumferential shoulder 29 coacting with the shoulder 13 to support the basket. A guide-sleeve 30 is riveted into a central perforation in the bottom of the basket. The sleeve 30 fits loosely around the stem 27. The top of the basket is formed to fit snugly into the top of the body 10.

The bottom of the basket 28 is spaced sufficiently far from the bottom of the body 10 to afford space for the plug 24 to move freely between the two positions of Figs. 1 and 2. At the same time by lifting the plug 24 beyond the position of Fig. 1, the plug will carry the basket up and the two may be removed together from the body for cleaning.

It will be evident that the embodiment of the invention herein disclosed is merely illustrative and may be modified or departed from in many ways without departing from the spirit and scope of the invention as pointed out in and limited only by the appended claims.

I claim:

1. A waste-pipe fitting comprising: a hollow body with upper and lower open ends; a strainer basket removably seated in the upper part of the body; a plug-supporting lug in the lower part of the body and extending toward the upright center axis of the body, said lug being substantially free from any enlargement or the like adjacent said center axis; a closure seat above the lug; a closure plug having a closure portion adapted to fit said closure seat and having a support below said closure portion, said support being adapted to extend below the supporting surface of said lug when said closure portion is in engagement with said closure seat and being adapted to rest upon said lug to hold said closure portion spaced above said closure seat; and a handle-member attached to the closure plug and extending up through the basket and being slidable and rotatable relatively to the basket to actuate said closure plug to closed and open positions without moving the basket.

2. A waste-pipe fitting comprising: a hollow body with upper and lower open ends; a strainer basket removably seated in the upper part of the body; a plug-supporting lug in the lower part of the body and extending substantially horizontally toward the upright center axis of the body; a closure seat above the lug; a disk-shaped closure plug having a closure portion adapted to fit said closure seat and having a support below and closely against the under surface of said closure portion with no space between the end of said support and the under surface of said closure portion at such outer end or ends of the said support remote from said center axis, said support being adapted to extend below the supporting surface of said lug when said closure portion is in engagement with said closure seat and being adapted to rest upon said lug to hold said closure portion spaced above said closure seat; and a handle-member attached to the closure plug and extending up through the basket and being slidable and rotatable relatively to the basket to actuate said closure plug to closed and open positions without moving the basket.

3. A waste-pipe fitting comprising: a hollow body with upper and lower open ends; a strainer basket removably seated in the upper part of the body; a plurality of circumferentially-spaced plug-supporting lugs in the lower part of the body and extending toward the upright center axis of the body, said lugs being substantially free from any enlargement or the like or connection with each other adjacent said center axis; a closure seat above the lugs; a closure plug having a disk-shaped closure portion adapted to fit said closure seat and having a support below and closely against the under surface of said closure portion with no space between the end of said support and the under surface of said closure portion at such outer end or ends of the said support remote from said center axis, said support being adapted to extend below the supporting surface of said lugs when said closure portion is in engagement with said closure seat and being adapted to rest upon one or more of said lugs to hold said closure portion spaced above said closure seat; and a handle-member attached to the closure plug and extending up through the basket and being slidable and rotatable relatively to the basket to actuate said closure plug to closed and open positions without moving the basket.

ELTON A. POPE.